United States Patent [19]

Etchepare

[11] Patent Number: 5,017,199
[45] Date of Patent: May 21, 1991

[54] SPENT SOLVENT RECOVERY IN CIRCUIT PROCESSING

[75] Inventor: Eduard E. Etchepare, El Toro, Calif.

[73] Assignee: Rockwell International Corporation, El Segundo, Calif.

[21] Appl. No.: 415,827

[22] Filed: Oct. 2, 1989

[51] Int. Cl.⁵ .............................................. B01D 53/00
[52] U.S. Cl. ......................................... 55/57; 55/355; 55/466; 137/132; 137/171; 137/177; 137/187
[58] Field of Search ........................... 55/466, 355, 57; 137/132, 171, 177, 179, 187

[56] References Cited

U.S. PATENT DOCUMENTS

| | | | |
|---|---|---|---|
| 541,277 | 6/1895 | Hornig | 55/355 |
| 2,626,006 | 1/1953 | Anderson | 137/179 |
| 3,216,663 | 11/1965 | Frampton et al. | 137/132 |
| 3,422,608 | 1/1969 | Hubbard | 137/132 |
| 3,933,449 | 1/1976 | Miselem | 55/466 |
| 4,846,206 | 7/1989 | Peterson | 137/132 |

FOREIGN PATENT DOCUMENTS

| | | | |
|---|---|---|---|
| 2155436 | 5/1973 | Fed. Rep. of Germany | 137/171 |
| 695864 | 8/1953 | United Kingdom | 137/171 |

Primary Examiner—Jay H. Woo
Assistant Examiner—C. Scott Bushey
Attorney, Agent, or Firm—H. Fredrick Hamann; George A. Montanye; Gregory D. Ogrod

[57] ABSTRACT

The invention provides an apparatus and method for removing spent solvent from manufacturing apparatus during operation. The apparatus uses a collection housing having input, exhaust, and output ports with U-shaped output transfer tubing positioned inside the housing and connected on one end to the output port. The output tubing arches upward inside the housing and has a tapered opening positioned near the bottom of the housing. Negative pressure is applied to the exhaust port to move cleaned air out of the housing and solvent laden air into the housing through the input port. Solvent precipitates from the air and collects as a liquid in the housing until the liquid level rises above the arched bottom of the transfer tubing. At this point, the solvent flows through the tubing and the output port, and out of the housing under the influence of gravity at atmospheric pressure. In further embodiments, a liquid level indicator using translucent is secured between a pair of access ports extending outward from a sidewall of the housing.

20 Claims, 4 Drawing Sheets

SPENT SOLVENT RECOVERY IN CIRCUIT PROCESSING

BACKGROUND OF THE INVENTION

1. Field of the Invention

The present invention relates to integrated circuit processing and more particularly to an apparatus and method for recovering spent solvent during the manufacture of electronic circuits and components. The invention further relates to a method of recovering spent solvent from wafer processing apparatus during the manufacture of electronic circuits or components.

2. Related Technical Art

During the manufacture of advanced integrated circuits or circuit elements, it is generally necessary to move substrates and assemblies through a series of different processing steps or stages. This is typically handled by a series of two or more machines known as "steppers" or wafer "tracks" which transport integrated circuit substrates and associated devices along predefined processing paths for implementation of various manufacturing steps.

In manufacturing integrated circuits and other miniaturized components, one or more layers of material such as spin on polymer, photo resist, or similar materials are used in the formation of device features, conductive lines, or intermediate dielectric or protective layers. Such materials are typically deposited in a liquid form containing solvents which allow the materials to flow freely across a given substrate or device surface, especially in spin-on processing techniques. During remaining processing or manufacturing steps, the solvent is extracted or removed and the liquid material forms into a solidified layer. If the solvent is removed at a substantially steady or uniform rate, the resulting upper surface of the deposited material is generally very planar.

Planar surfaces play a key role in the design and manufacture of many advanced electronic circuits, elements, or components. It is necessary to minimize surface variations as much as possible to decrease the effects of parasitics, stray capacitances, and complications due to material stress. In advanced integrated circuit designs it is typically desirable to achieve a surface planarity within 50–200Å or less. However, problems arise in achieving this goal due to current solvent extraction techniques employed in circuit manufacturing.

Variations in solvent evaporation and removal produce significant thickness and planarity variations in the resulting hardened material surfaces. Therefore, the general atmospheric pressure and any air flow patterns, as well as solvent or chemical concentrations, must be highly controlled during manufacturing steps to satisfy design criteria. Sudden changes in the solvent removal environment result in substantial surface variations. This includes not only the general atmospheric pressure within a processing chamber or station but the atmospheric concentration of evaporated solvent which affects subsequent solvent extraction rates. Since solvent atmospheric concentration changes as a function of the amount of removed solvent, spent solvent must be collected within a processing chamber and removed to maintain a consistent extraction rate. In addition, if the solvent vapor is not removed rapidly enough the suspended solvent can form droplets which fall on the devices being manufactured and cause damage or contamination. This is also true for suspended resist and other materials. Solvent removal is typically accomplished by drawing air from the processing area, or volume, through a manifold which has a reservoir operating under negative pressure where the solvent is separated and deposited. The air, once cleaned of solvent, is then exhausted. However, the solvent accumulates in the reservoir and must be periodically emptied. Therefore, the manufacturing process is typically stopped and spent solvent is removed before further processing occurs in order to maintain the desired planarity and other circuit characteristics.

However, stopping the manufacturing process for solvent removal presents at least two major problems. One problem is an increase in personnel safety problems and contamination due to the probabilities of a solvent spill. At the same time, the processing equipment, area, or plant can become contaminated which decreases production and increases operating costs. A second problem is a decrease in throughput during periodic stoppages and a related difficulty in maintaining adequate control over processing step parameters.

An alternative to reduce these problems is to provide very large solvent reservoirs. However, this increases equipment costs and complexity and requires large exhaust systems. In addition, this only represents a partial mitigation but not a resolution of the problem.

What is needed is a method and apparatus for removing spent solvent while the manufacturing process continues and which decreases the impact of solvent removal activities on the processing and increases manufacturing throughput.

SUMMARY

The present invention provides an apparatus and method for removing spent solvent from a reservoir in a manufacturing apparatus.

The present invention also provides a method for removing spent solvent from processing apparatus during the continued manufacture of integrated circuits and the like.

One advantage of the present invention is a substantial decrease in the impact of solvent removal on processing characteristics.

Another advantage of the present invention is the increase in manufacturing throughput by decreasing down time.

An additional advantage of the present invention is low complexity and ease of application to a variety of processing apparatus.

These and other purposes, objects, and advantages of the invention are provided in a solvent recovery apparatus or trap using a substantially fluid tight collection housing having an input port through which air laden with solvent is received from a manufacturing process or machine. An exhaust port connected to the housing is used to remove cleaned air from the housing while collected solvent is transferred out of the housing through an output transfer member. Spent solvent is removed or emptied from the housing during a manufacturing process without interruption of the processing.

In a preferred embodiment, the output transfer member comprises an arcuate tubing element, preferably having a U-shaped configuration, positioned inside the housing. One end of the tubing element is connected to an output port or passage in a sidewall of the housing. The tubing is secured in the housing so that it arches upward from its output connection and then extends downward toward the bottom of the housing. The downward facing end of the tubing has a variable width or tapered opening. The variable taper on the second opening of the tubing member controls the feed characteristics of the tubing member.

Negative pressure is applied to the exhaust port to transfer air out of the housing to other apparatus for further cleaning, recycling, or disposal. The static pressure within the housing is typically maintained at around 1.5 inches which serves to draw air from the manufacturing equipment into the housing. As air enters the housing, solvent precipitates to the bottom of the housing. As the level of the solvent rises above the bottom, and the bottom of the highest portion of the tubing member, it flows out of the housing under the influence of gravity. Therefore, the solvent acts as an inherent barrier between the external atmospheric pressure and the negative pressure applied to the exhaust port. An advantage of the invention is the application of very low-pressure, gravity-assisted flow which minimizes impact on manufacture processing.

In further aspects of the invention, the apparatus comprises a level indication element connected to the housing so as to receive a portion of solvent residing therein and provide visual indication of its relative level. This is accomplished by a pair of access ports connected to, and extending outward, from a sidewall of the housing. A substantially translucent or preferably transparent tube is secured between these access ports. By locating the access ports one above the other in vertical alignment, solvent flows into the tubing from the bottom and obtains a height commensurate with that of the solvent level inside the housing.

The housing comprises a generally cylindrical housing made from material such as stainless steel, plastic, or glass, with stainless steel being preferred. The housing uses a separable cover or lid which incorporates the input and exhaust ports and is itself typically incorporated into a system manifold for the manufacturing apparatus. When glass or plastic housing structures are used, an upper portion of the housing is typically threaded to engage the cover or manifold which acts as a support element for the housing. When stainless steel is employed, the housing engages a planar cover with a sealing member or O-ring and is held in place by a support platform.

The output transfer member or arcuate tubing element comprises stainless steel and is generally formed from separate segments which are welded, or otherwise joined together, in the desired U-shaped form. One end of the tubing is secured to the housing sidewall at the output port, typically by welding but alternatively using compression type fittings. The other end of the tubing extends downward where a support foot can be added to provide increased stability.

BRIEF DESCRIPTION OF THE DRAWINGS

The novel features of the present invention may be better understood from the following description when taken in conjunction with the accompanying drawings in which like characters refer to like parts and in which.

DETAILED DESCRIPTION OF PREFERRED EMBODIMENTS

The present invention provides a new apparatus for removing spent solvents from processing chambers or regions of advanced electronic device or integrated circuit manufacturing lines during production. The present invention removes spent solvent while maintaining desirable processing conditions such as pressure or chemical vapor concentration to prevent alteration of processing characteristics. At the same time, the present invention provides for the safe removal of spent solvent in a low complexity manner with readily adaptable apparatus.

Figure 1:
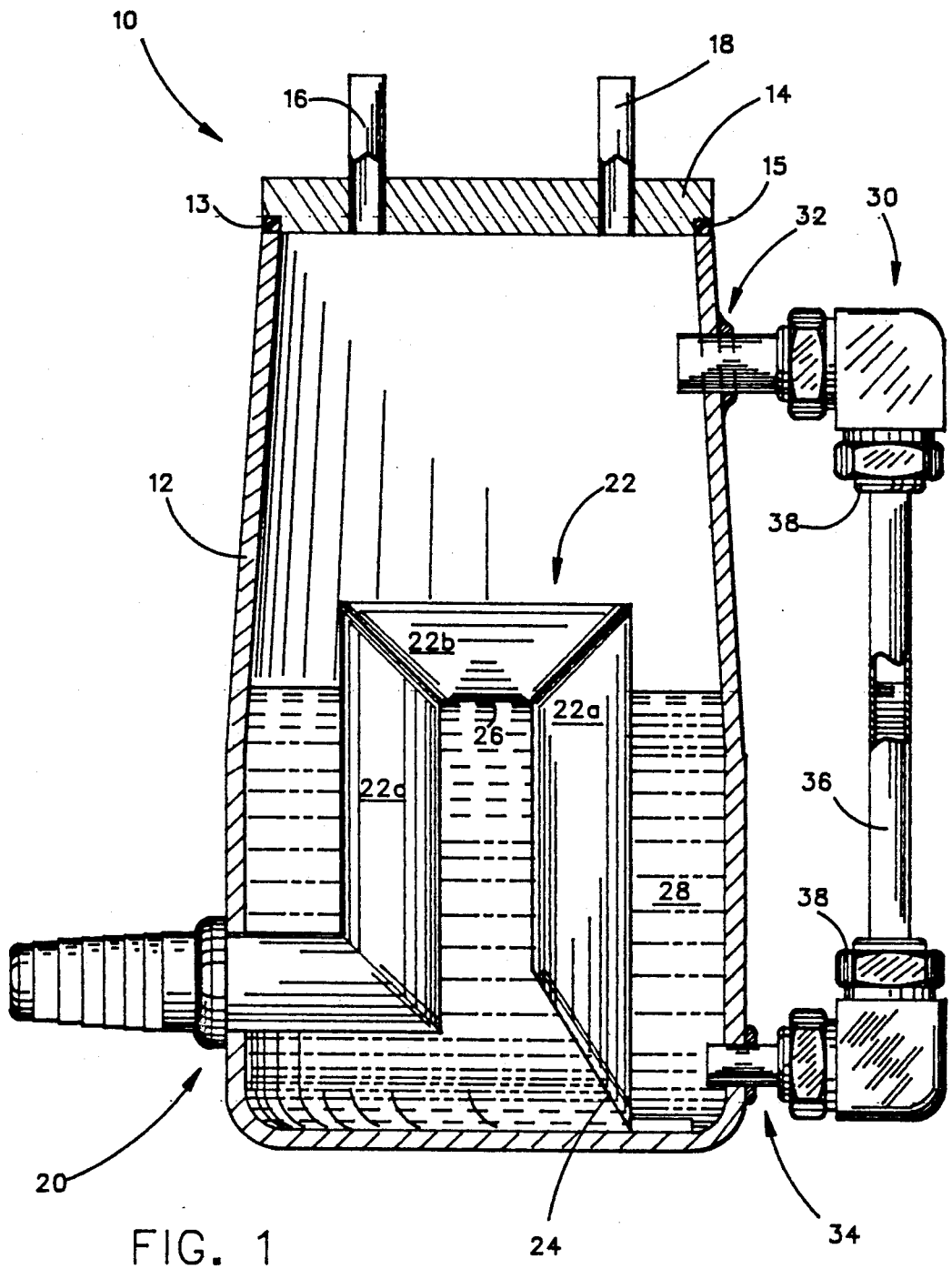
FIG. 1 illustrates a side sectional view of a spent solvent apparatus constructed according to the principles of the present invention.
Figure 2:
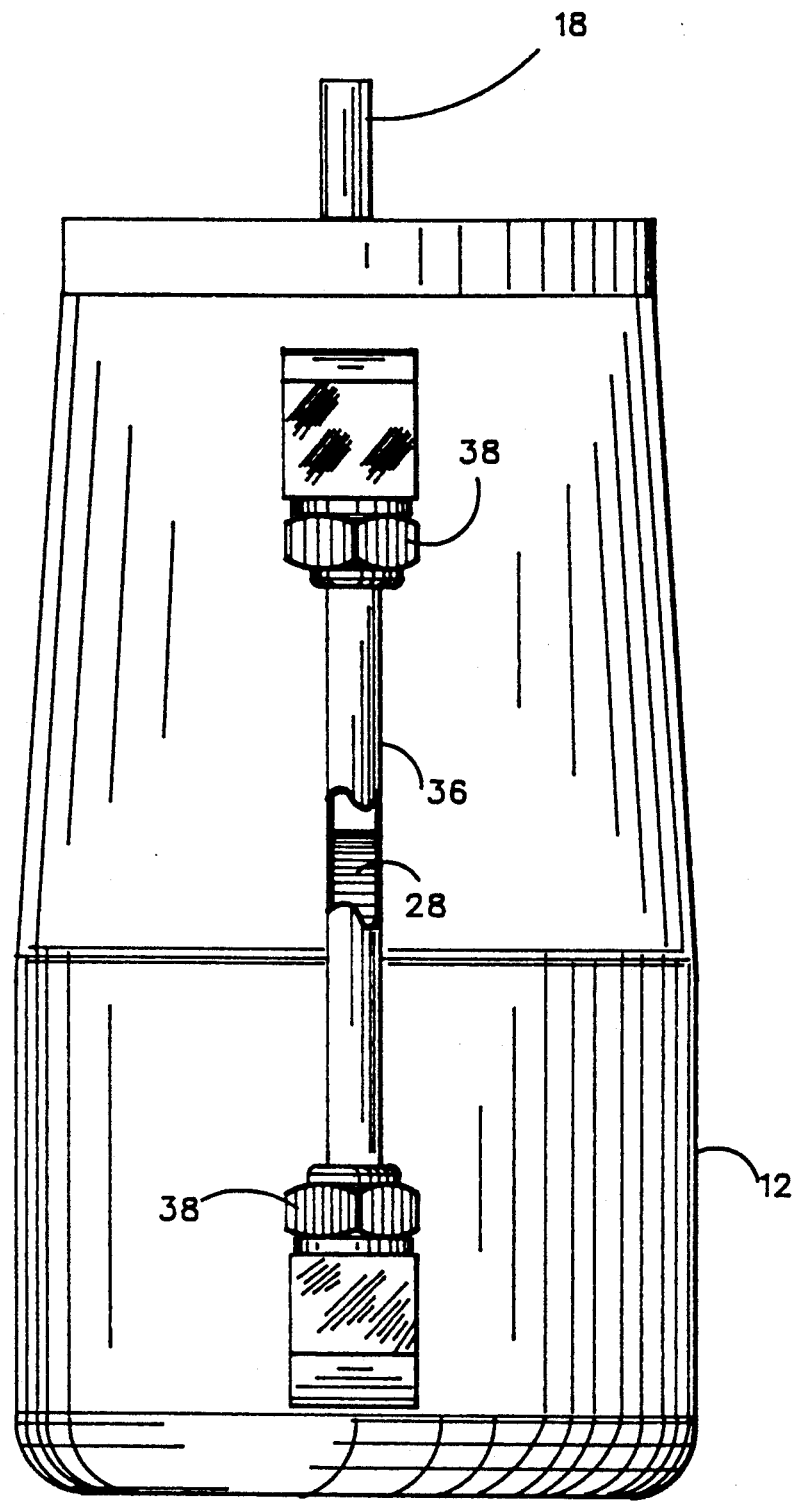
FIG. 2 illustrates a back elevation of the apparatus of FIG. 1.
Figure 3:
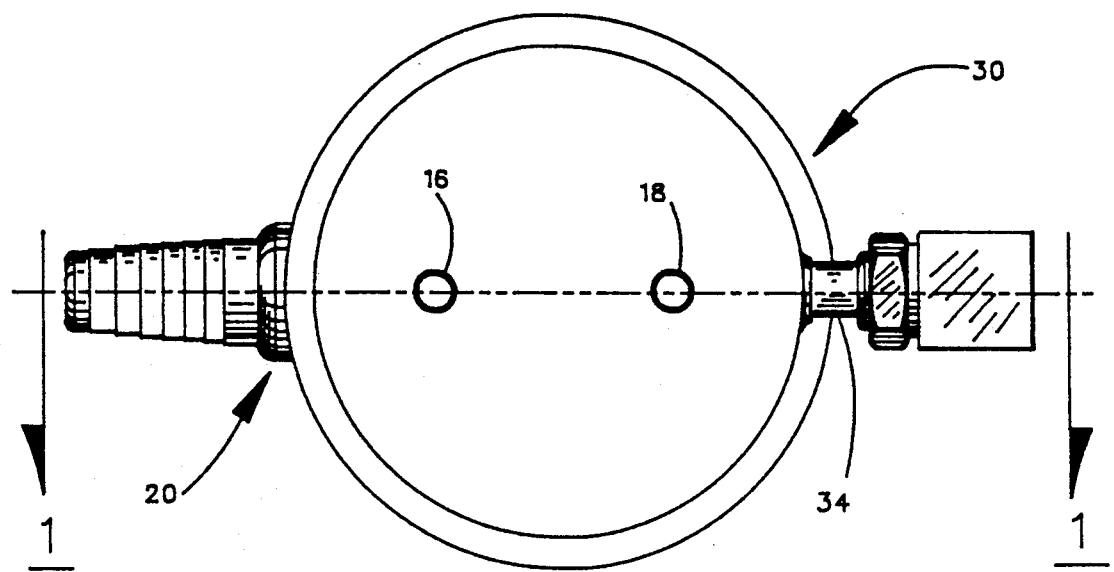
FIG. 3 illustrates a top plan view of the apparatus of FIG. 1.

A spent solvent trap and removal apparatus is illustrated beginning in FIGS. 1 and 2. In FIGS. 1 and 2, the removal apparatus 10 is shown using a generally cylindrical trap housing 12 also shown having a removable or separable top cover 14. The cover or lid 14 is generally attached or secured to the processing machine being serviced by the removal apparatus 10. In preferred embodiments, the cover 14 is connected to or forms an integral part of an exhaust manifold, not shown, which is employed on such equipment for exhausting air containing the solvent from the processing regions. Those skilled in the art are familiar with the structure of such manifolds.

The housing 12 comprises one of a variety of materials, such as, but not limited to, stainless steel, copper, glass, or plastic, although multiple materials can sometimes be employed together. It is desirable to use a material capable of withstanding the negative pressures involved, continued use and handling without destruction, and exhibiting substantially no reactivity to the solvents being used. Unfortunately, many plastics are severely degraded by continued exposure to the solvents of interest.

For added stiffness or support, the housing 12 can have an inwardly curved bottom. If desired, the housing 12 can be insulated or surrounded with a temperature controlling wrap or emersion bath to increase condensation or precipitation of solvent, although this is generally considered unnecessary for adequate operation.

The housing 12 is mounted or supported in place adjacent to a manufacturing machine using a variety of support ledges or platforms. In typical installations, a small support platform is provided which is raised and lowered using conventional hydraulic or electromechanical actuators. In this configuration, the cover 14 need not provide any special supportive engagement such as clamps, brackets, or clasps. However, the cover 14 should provide a mating seal with the top portion of the housing 12.

To provide a reasonably air and liquid tight seal with the housing 12, the cover 14 is provided with an annular sealing member 13, such as a flat flexible washer or an O-ring, which is retained in the interface between the housing 12 and the cover 14. A retaining slot or depression 15 is generally used around the periphery of the cover 14, or the housing 12, for this purpose. The sealing member comprises seals known and used in the art such as rubber gaskets or O-rings and can be coated with a sealing compound or grease where desired.

As shown in FIG. 1, the cover 14 has at least one inlet port 16 and an exhaust port 18 which are generally incorporated into an exhaust manifold system, not shown, used on the manufacturing machine being serviced. The manifold is constructed using known principles and designs and can be used to transfer solvent laden air from several areas or portions of a processing machine to an exhaust line. The inlet port 16 is used to transfer air or atmosphere which contains the solvent from the processing machine into the housing 12. The exhaust port 18 is used to transfer circulating air from the housing 12 into another apparatus or a vapor exhaust system generally used for processing or disposing of "contaminated" air. There may be multiple exhaust systems employed in complicated processes. As negative pressure is applied to the exhaust portion of the manifold, air is drawn from the processing machine into and through the solvent trap. In some applications, the exhausted air can be recycled to the processing stages since spent solvent has been removed and a higher solvent extraction rate could be maintained.

In the preferred embodiment the cover or lid 14 comprises a plate-like member, manufactured from material such as polytetraflouroethylene, plastic, or stainless steel, that is physically incorporated into an exhaust manifold structure for the processing equipment being serviced. However, for some applications the cover 14 comprises an independently removable cover mounted on the housing 12 which has input and exhaust ports 16 and 18, respectively, formed on an upper surface. These ports are connected to the processing equipment through one or more tubing members or channels. The exhaust port 18 on the cover 14 can also be connected to independent exhaust processing equipment where desired. In this manner, a variety of apparatus can be easily retroactively fitted with the solvent trap 10.

As shown in FIG. 1, a generally U-shaped tube 22 is mounted in an inverted orientation within a lower portion of the housing 12. The tube 22 comprises either a curved unitary tubing member or a multi-segmented structure manufactured from smaller segments 22a, 22b, and 22c, which are joined together to form a single unit. For multi-segmented structures, the tubing is joined together using techniques known in the art such as welding. This latter approach is useful when the tubing diameter is sufficiently large and makes bending of the tubing into a smooth shape difficult or complex. At the same time, some materials which might be used to resist the corrosive effects of some solvents are hard to work into curved shapes.

It will be readily apparent to those skilled in the art that the dimensions of the tubing or segments 22 are determined by the amount of solvent to be captured and removed from the housing 12, as well as the amount of liquid desired in the housing 12 to maintain an adequate pressure seal. In an exemplary embodiment, tubing having a diameter of about 1 inch and a wall thickness of about 0.065 inches was employed and the U-shaped arch was manufactured with a height of about 4-4.75 inches. In this embodiment, housing 12 was on the order of 10-11 inches high and 5-6 inches in diameter.

The tubing 22 is connected to an output passage or port 20 in the lower sidewall of the housing 12. The tubing 22 can extend through the sidewall where it is connected to other tubing or apparatus which can include a valve. The tubing 22 is held in place and a liquid tight seal provided by welding, bonding, or the like.

Negative pressure is applied to the exhaust port 18 to draw processing air through the housing 12. This pressure is typically on the order of 1.5 inches of static pressure and is provided by air pumps known in the art. The application of pressure is generally controlled by specialized sensors, some of which can be placed in the input or exhaust lines of the manifold or in the input and exhaust ports 16 and 18.

As air is drawn through the housing 12, solvent condenses or drops out and forms a liquid bath 28 in the bottom of the housing 12. In current designs, the solvent trap housing or container is installed on a machine manifold and left in place until it fills with solvent 28. At this point, manufacturing or processing is halted and the trap removed to dispose of the collected liquid. The now emptied trap container is replaced and the processing re-commenced. As stated above, stoppage of processing decreases throughput and increases variations in resulting products. However, the present invention overcomes this shortcoming by allowing removal of solvent without stoppage.

As the solvent level increases in the housing 12, it rises above the floor or "bottom" wall 26 of the upper portion of the arcuate tubing 22. As the solvent level rises above this height, solvent 28 is free to flow out through the tubing 22, and the output port 20, under the influence of gravity. To facilitate this process, the input end 24 of the tubing 22 is beveled or slanted to provide an unobstructed and low turbulence path for the solvent 28. The beveled cut on the tubing also causes a small amount of air to intrude into the housing and the manifold system should the solvent level drop too low. This air intrusion would be easily detected and cause the processing to be stopped in a controlled manner, as opposed to a sudden burst of large amounts of air which could cause a larger sudden alteration of pressure and solvent transfer rates in an uncontrolled or turbulent manner.

As will be readily apparent, a certain amount of solvent 28 must reside in the housing 12 in order to maintain the pressure seal between the low static pressure and the outside atmosphere to which the solvent 28 is draining. Therefore, some solvent must be placed in the housing 12 prior to applying negative pressure to the port 18 or before opening the output port 20 to atmospheric pressure. It is contemplated that the balance between the influx and outflow of solvent will cause the entire tubing 22 to remain submerged in the solvent 28 as it is processed.

When the housing 12 comprises stainless steel or similar materials which are opaque, a liquid level gauge is generally desired to monitor operation. FIGS. 1 and 2 illustrate a preferred method of incorporating a liquid level indication gauge 30 into the housing 12. As seen in FIG. 1, upper and lower transfer ports 32 and 34 are provided. Connected between these ports is a translucent or transparent viewing tube 36. The ports allow the free flow or transfer of liquid and air from the housing 12 into the tube 36.

Liquid solvent enters the tube 36 through the port 34 and air having the same pressure as the housing 12 enters the viewing tube 36 through the port 32. The port 32 provides local atmospheric pressure to allow the liquid level to obtain that of the housing 12. Otherwise, the liquid would be working against the vacuum or pressure of a sealed tube.

In a preferred embodiment, the tubing member 36 comprises a plastic tube made from material such as, but not limited to, poly tetraflouroethylene. However, glass tubing can also be employed where desired. Generally, the solvent being processed has some color, often due to the presence of dissolved materials such as resist, that makes it readily visible through translucent tubing. However, lighter colored solvent may require clear tubing for the member 36 in order to be adequately visible. In addition, a small colored float can be employed in the tubing 36 for improved visibility or level indication and detection. Where desired, a level sensor can be employed to detect the solvent 28 level and provide control signals for indicating level changes above or below desired threshold levels. In this manner, air intrusion is avoided, an output drain valve can be activated, or processing stopped, depending upon the level of the solvent.

The ports 32 and 34 generally comprise metal tubing, such as 0.5 inch diameter stainless steel tubing, soldered or welded to the sidewall of the housing 12 to form a fluid tight seal. However, threaded fillings or compression seals can be employed. A portion of the tubing material may extend inside of the housing 12. The tubing 36 is then secured to the ports 32 and 34 tubing using devices such as, but not limited to, elbow compression fittings 38. Compression fittings 38 are generally preferred because they allow simple attachment, maintenance, and replacement of the tubing 36.

The implementation of the invention with a liquid level indicator is unnecessary when the housing 12 is manufactured from non-opaque materials, such as glass or plastic. In this alternate embodiment, it is possible to directly observe the solvent liquid level without additional fluid ports or hardware. However, translucent or transparent materials generally require alternate construction methods for the arcuate tubing 22. This is especially true for implementations using thin walled plastics.

When using materials such as glass or plastic, it is preferable to employ like materials for the construction of the tubing member 22 which simplifies mounting techniques. That is, glass is easily secured to glass using known melting techniques, and plastic is easily fused, bonded, or melted onto plastic using known techniques. At the same time, sealing joints of dissimilar materials such as metal to glass are more difficult to obtain. However, for some applications it may be desirable to utilize dissimilar materials such as metal tubing and plastic walls. In this type of embodiment a compression type of feedthrough assembly is employed.

Figure 4:
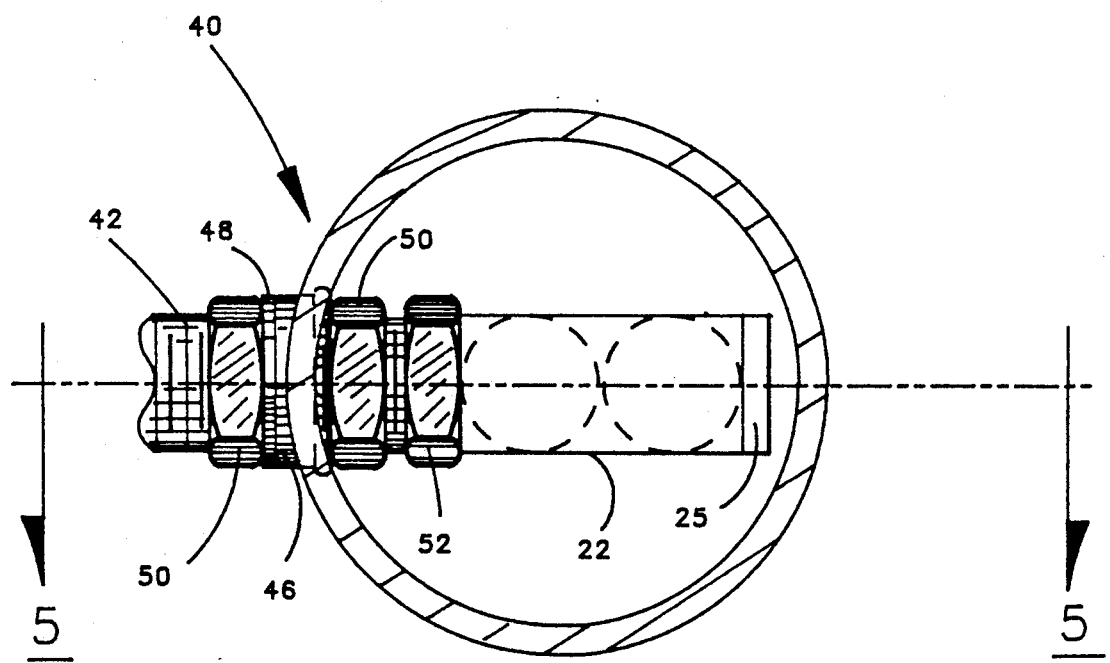
FIG. 4 illustrates a top elevation of an alternate embodiment of the apparatus of FIG. 1.
Figure 5:
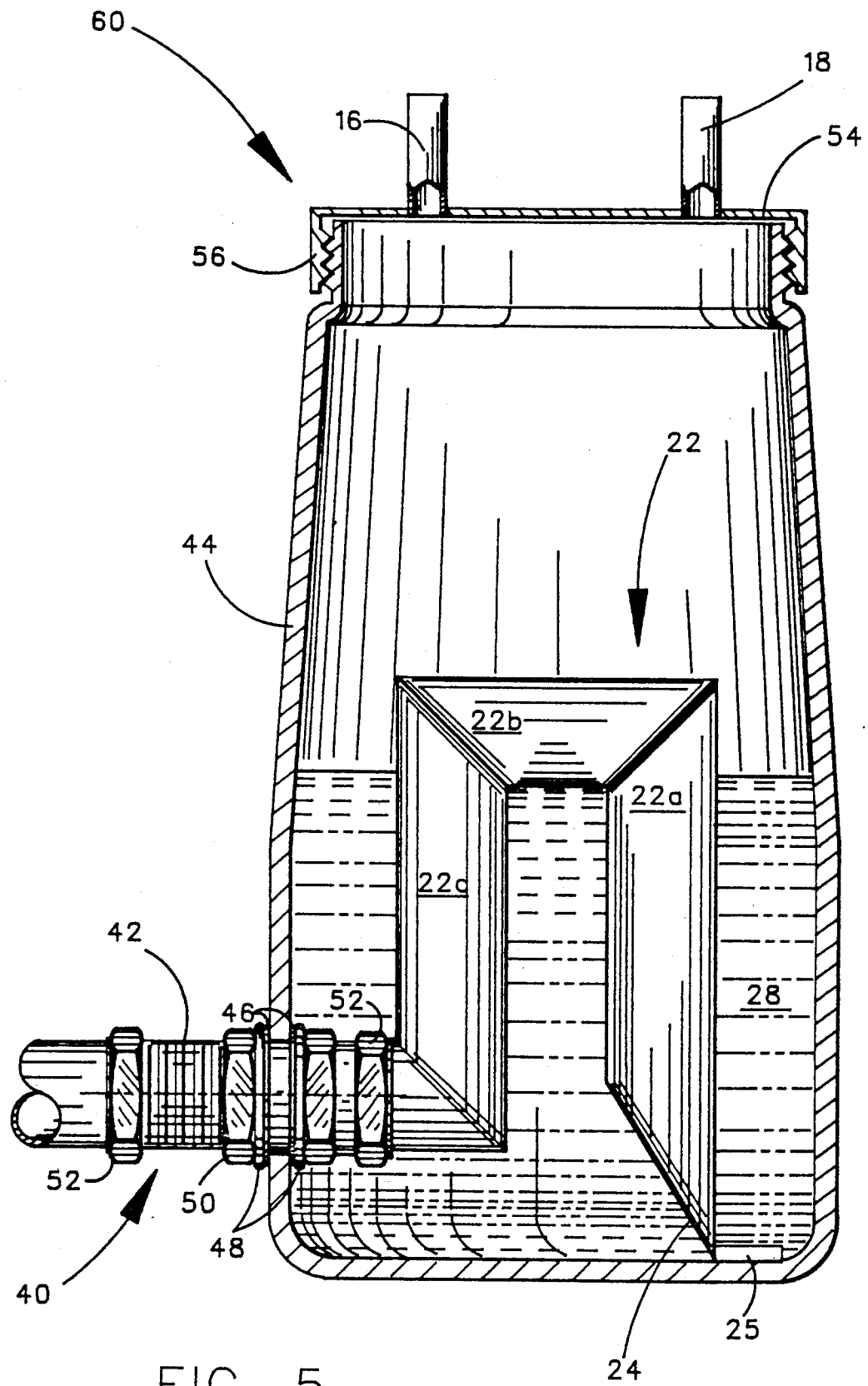
FIG. 5 illustrates a side elevation of the apparatus of FIG. 4.

FIGS. 4 and 5 illustrate a feedthrough assembly 40 for accommodating a metal tubing member 22 within a solvent trap 60 using a thin walled plastic housing. In FIGS. 4 and 5, a threaded feedthrough body 42 is inserted through a hole in the sidewall 44 of the housing 12. The feedthrough body 42 comprises material such as stainless steel or brass, although plastic is useful for some applications. The inner diameter of the body 42 is generally close to that of the tubing 22. At least one flexible seal 46 is placed over the body 42 adjacent the wall 44 followed by a washer 48 and a nut 50. The nut 50 presses the seal against the wall 44 of the housing and the body 42 to provide a liquid tight seal and a second nut 50 is provided on the outside of the wall 44 to hold the feedthrough assembly 40 in place. The tubing member 22 is then secured to the body 42 using a compression type nut 52 which is concentric with the tube 22. Where desired for improved support or sealing, a second seal 46 and washer 48 can be used on the outside of the sidewall 44. It will be apparent that this same technique can be used to secure glass or plastic tubing in place with metal plastic, or glass sidewalls.

When flexible, thin walled material is used to construct the housing 12, a support foot 25 is generally required to prevent wall deformation from the weight of the tubing member 22. Metal walls having thicknesses of 0.04–0.07 inches or greater are typically not flexible enough to require extra support. Additionally, plastic and metal housing materials allow construction with threaded surfaces for interfacing with a cover 54. In this latter embodiment, the cover 54 is also threaded and the threaded region 56 acts as the support for the housing 12. Threaded interface covers or plates are often used with current solvent collection apparatus. Therefore, those skilled in the art will readily understand the types and dimensions of threads required for this application.

What has been described is a new apparatus and method for removing spent solvent from a manufacturing process during operation using gravitational forces to transfer solvent and a liquid barrier and trap to isolate any processing volume from the influences of outside atmosphere.

The foregoing description of preferred embodiments has been presented for purposes of illustration and description. It is not intended to be exhaustive nor to limit the invention to the precise forms disclosed, and many modifications and variations are possible in light of the above teaching. Larger or smaller housings, output tubing, alternate clamps or fasteners and dimensions can be employed. The embodiments were chosen and described to best explain the principles of the invention and its practical application to thereby enable others skilled in the art to best utilize the invention in various embodiments and with various modifications as are suited to the particular use contemplated. It is intended that the scope of the invention be defined by the claims and their equivalents.

What I claim as my invention is:

1. A method of removing solvent from a manufacturing system during processing, comprising the steps of:
   connecting a substantially fluid tight chamber to said manufacturing system, said chamber having input means for receiving air laden with solvent from the system, exhaust means for removing cleaned air from the chamber, and a fluid output port disposed on a sidewall of said chamber adjacent a bottom portion thereof through which spent solvent is transferred out of said chamber;
   connecting an inverted U-shaped tubing member on one end to said output port;
   positioning a second end of said tubing member adjacent the chamber bottom;
   extending said tubing upward away from said output port and then downward toward said chamber a bottom in a generally inverted U configuration within said housing interior;
   applying a negative pressure to said exhaust means so as to draw solvent laden air into said housing and reduced solvent content air out of said chamber; and
   providing a predetermined minimum volume of solvent within said chamber so as to maintain a predetermined minimum pressure barrier between said applied negative pressure and pressure exterior of said chamber to which said tubing member is connected.

2. The method of claim 1 wherein said step of providing a predetermined minimum volume of solvent comprises the step of maintaining a sufficient volume of solvent within said chamber to submerge substantially all of said tubing member.

3. Apparatus for recovering solvent from a manufacturing process comprising:
a collection housing having a substantially fluid tight interior volume;
input means connected to said housing for receiving air laden with solvent from said process;
exhaust means connected to said housing for removing cleaned air from said housing;
at least one fluid output port disposed on a sidewall of said housing adjacent a bottom portion thereof for transferring collected solvent out of the interior of said housing; and
an arcuate tubing member positioned within said housing interior, having an opening on a first end connected to said output port and an opening on a second end extending downward toward a housing bottom region, said tubing member having a central portion that extends upward in a generally inverted U shape from and between said first and second ends.

4. The recovery apparatus of claim 3 wherein said collection housing comprises generally cylindrical sidewalls terminating on one end in a generally circular bottom wall.

5. The recovery apparatus of claim 4 wherein said collection housing terminates on a second end in a removable cover with a fluid seal between said sidewall and said cover; and
said input means comprises at least one inlet port disposed on said removable cover for passage of solvent laden air.

6. The recovery apparatus of claim 4 wherein said exhaust means comprises at least one exhaust port disposed on said removable cover.

7. The apparatus of claim 3 further comprising input and output port means connected to a sidewall of said housing in vertical alignment and a viewing tube connected between said ports so as to receive a portion of fluid residing in said housing.

8. The apparatus of claim 7 wherein said viewing tube is translucent.

9. The apparatus of claim 8 wherein said viewing tube is transparent.

10. The apparatus of claim 8 wherein said viewing tube comprises a material chosen from the group of plastic or glass.

11. The apparatus of claim 3 wherein said collection housing comprises a generally cylindrical sidewall and a closed bottom joined thereto and being substantially fluid tight.

12. The apparatus of claim 11 wherein said housing comprises a material chosen from the group of stainless steel, plastic, or glass.

13. The apparatus of claim 11 wherein said housing employs a threaded top edge for engaging a support cover.

14. The apparatus of claim 1 wherein said tubing member comprises stainless steel.

15. The apparatus of claim 14 wherein said tubing member comprises multiple interconnected segments.

16. The apparatus of claim 3 wherein said output ports comprises a passage in a sidewall of said collection housing and said tubing member first end extends therethrough, and is sealed about its periphery to said housing.

17. The apparatus of claim 3 wherein said output ports comprises a threaded tubular body extending through a sidewall of said housing being configured to accept compression type fittings on each end thereof and further comprising:
at least one annular seal disposed about said body adjacent an inner wall of said housing;
at least one backing washer disposed about said body adjacent said annular seal;
at least a first backing nut disposed about said body adjacent said backing washer; and
at least a second backing nut disposed about said body adjacent an outer wall of said housing.

18. The apparatus of claim 3 wherein said central portion is positioned so as to remain submerged below a desired minimum fluid level in said housing.

19. The apparatus of claim 3 further comprising a support foot connected to said second end of said tubing member.

20. The apparatus of claim 3 wherein said second end of said tubing member comprises a sharply tapered opening.

* * * * *